Aug. 7, 1951 — G. E. LEWIS — 2,563,254
THICKNESS INDICATOR
Filed May 10, 1948 — 9 Sheets-Sheet 3
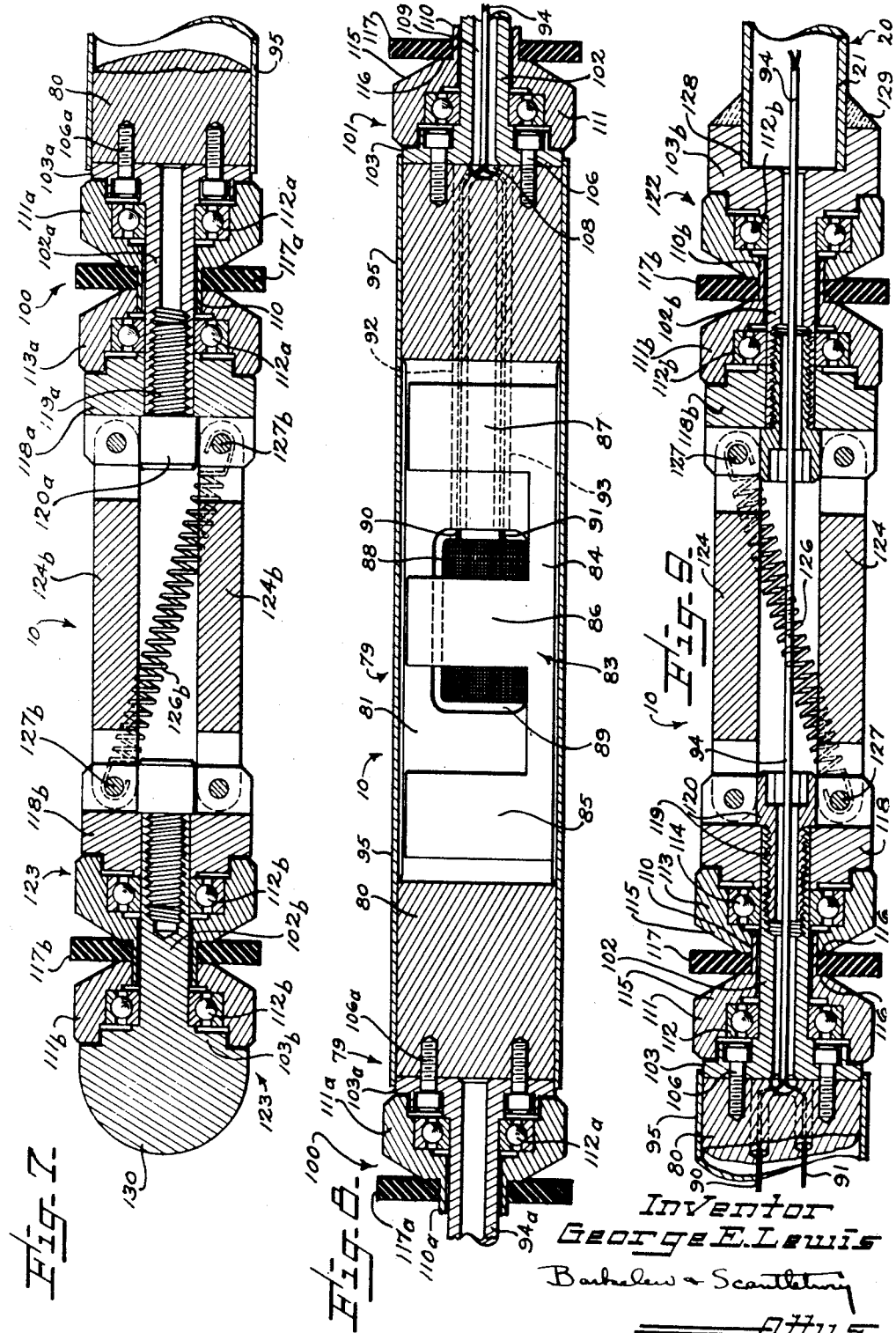
Inventor
George E. Lewis
Barkalow & Scantlebury
Attys.

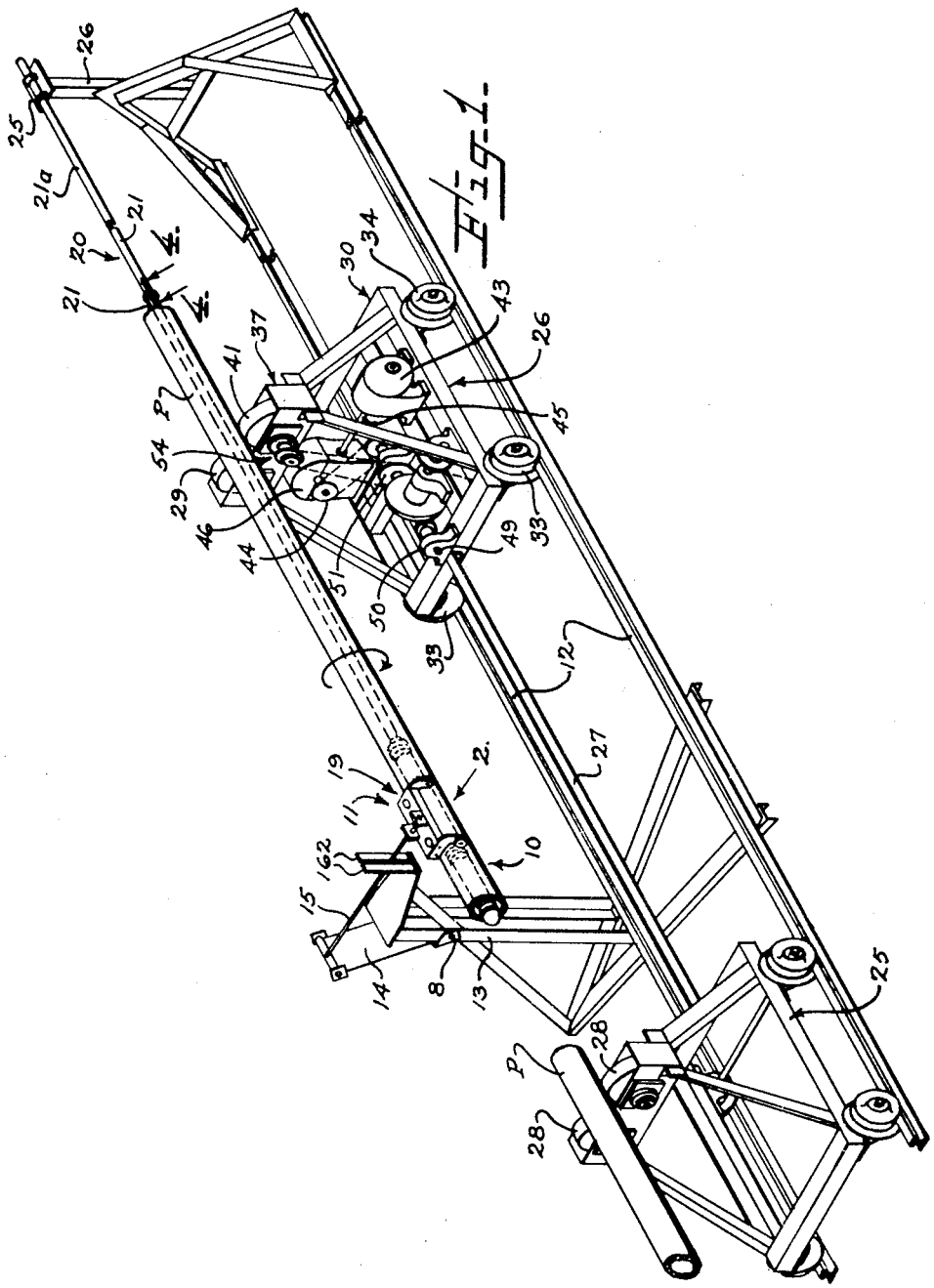

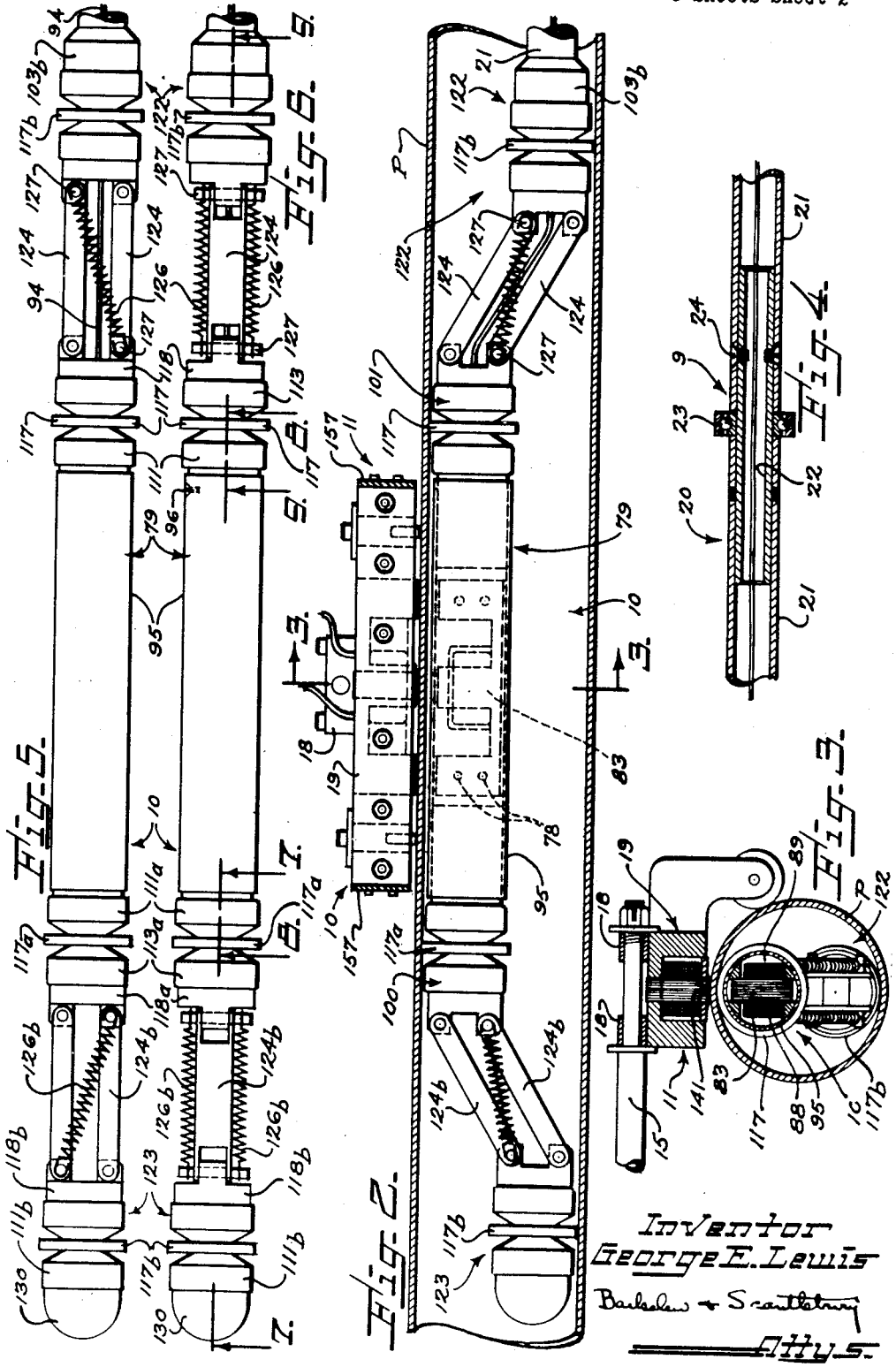

Aug. 7, 1951          G. E. LEWIS          2,563,254
THICKNESS INDICATOR
Filed May 10, 1948                        9 Sheets-Sheet 4
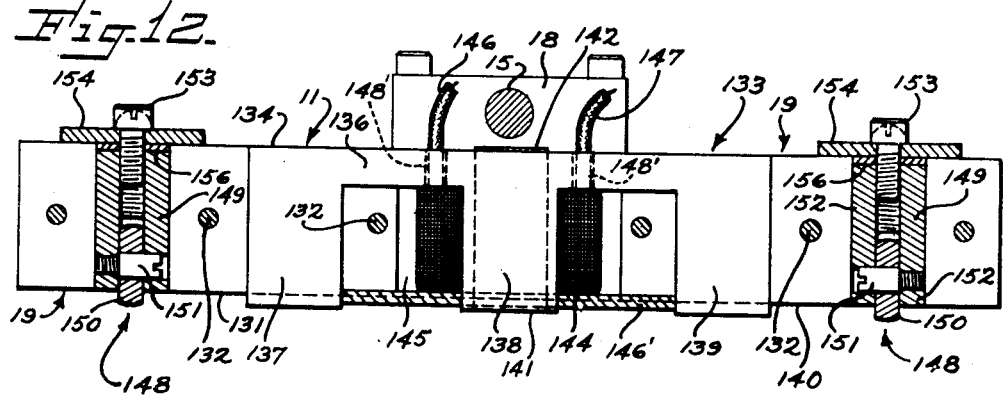
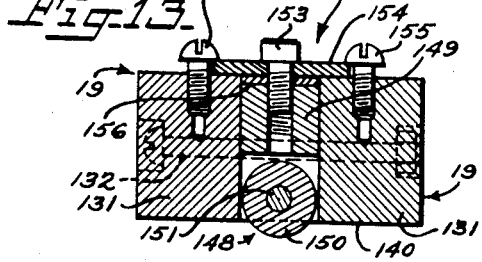
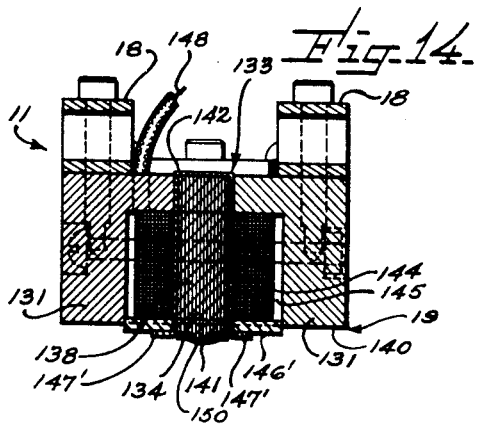
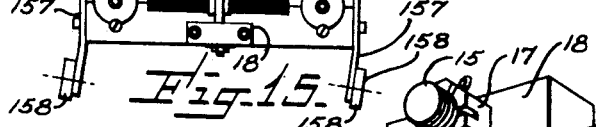
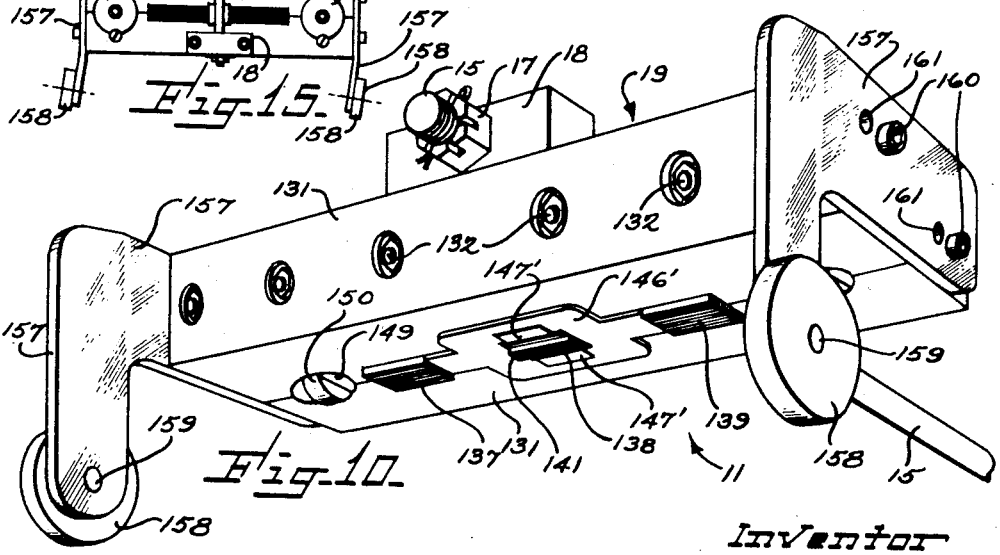
Inventor
George E. Lewis
Barkelew & Scantlebury
Attys.

Aug. 7, 1951   G. E. LEWIS   2,563,254
THICKNESS INDICATOR
Filed May 10, 1948   9 Sheets-Sheet 5
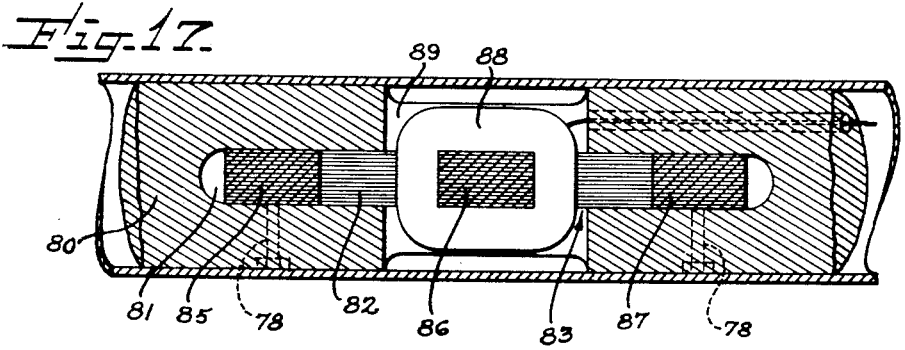
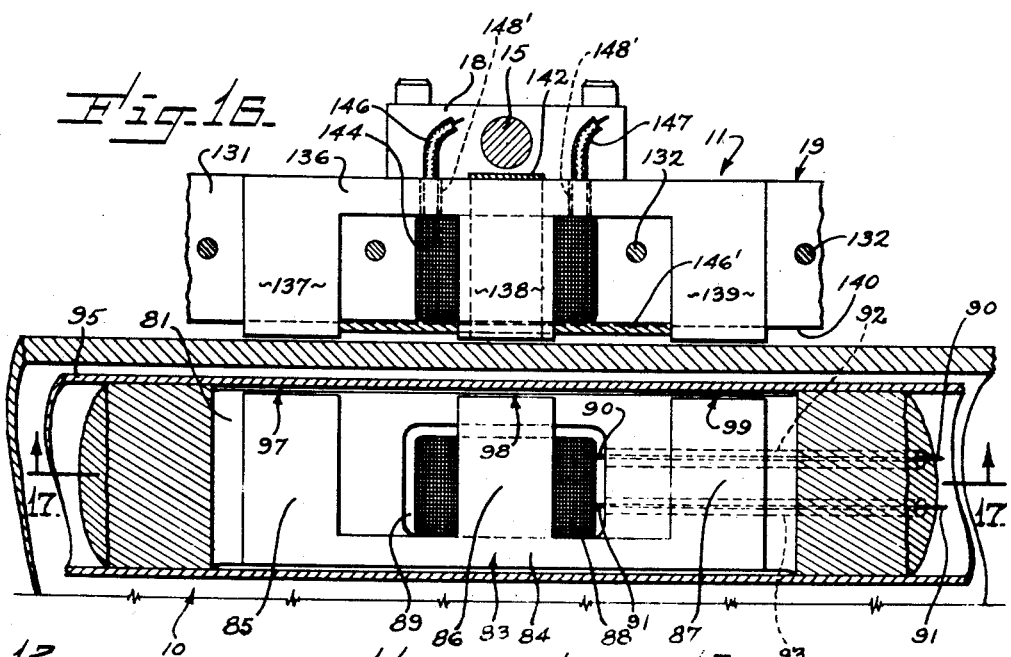
Inventor
George E. Lewis
Barkelew + Scantlebury
Attys.

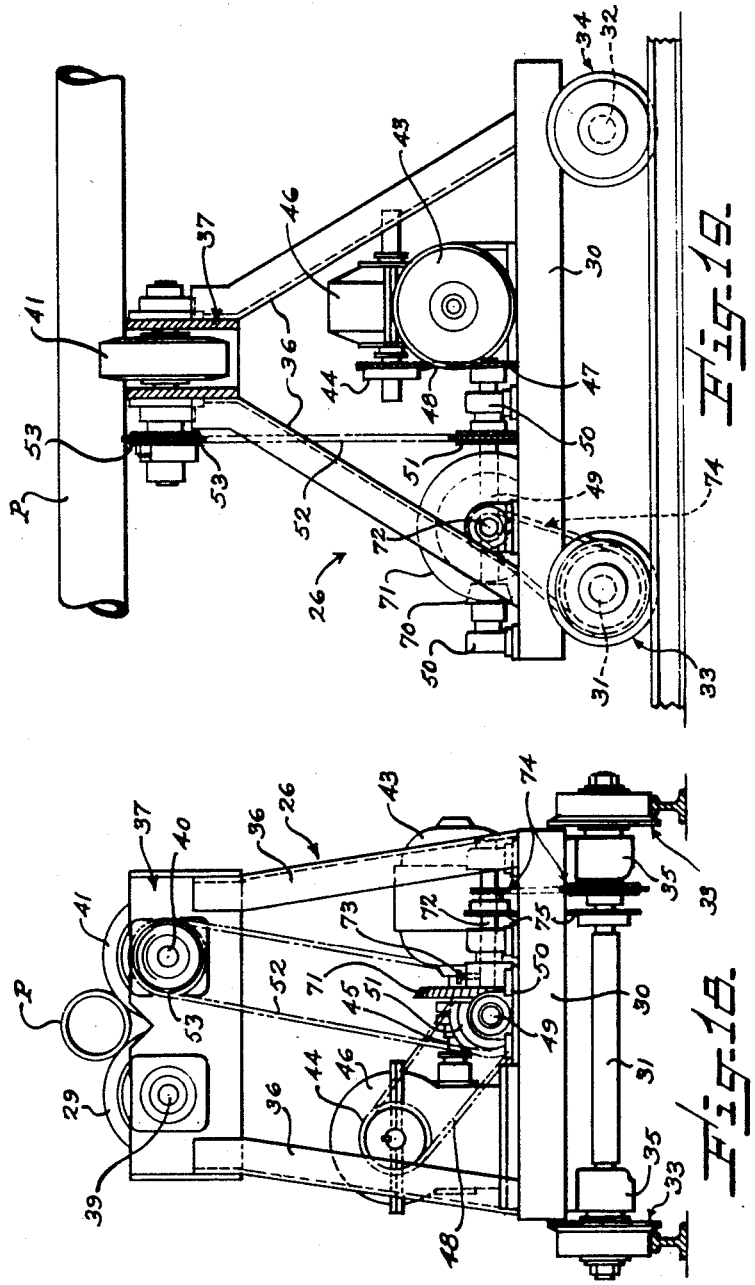

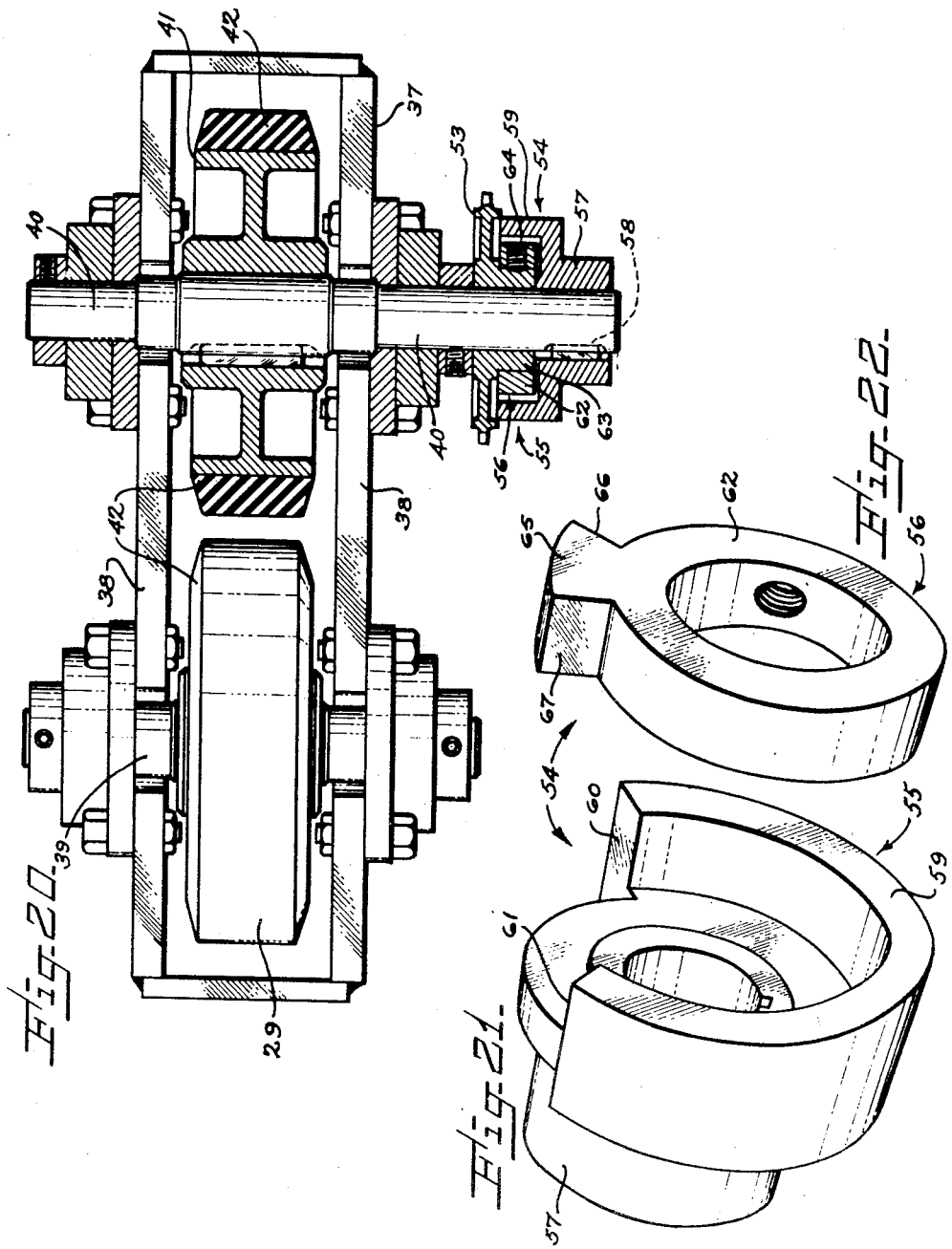

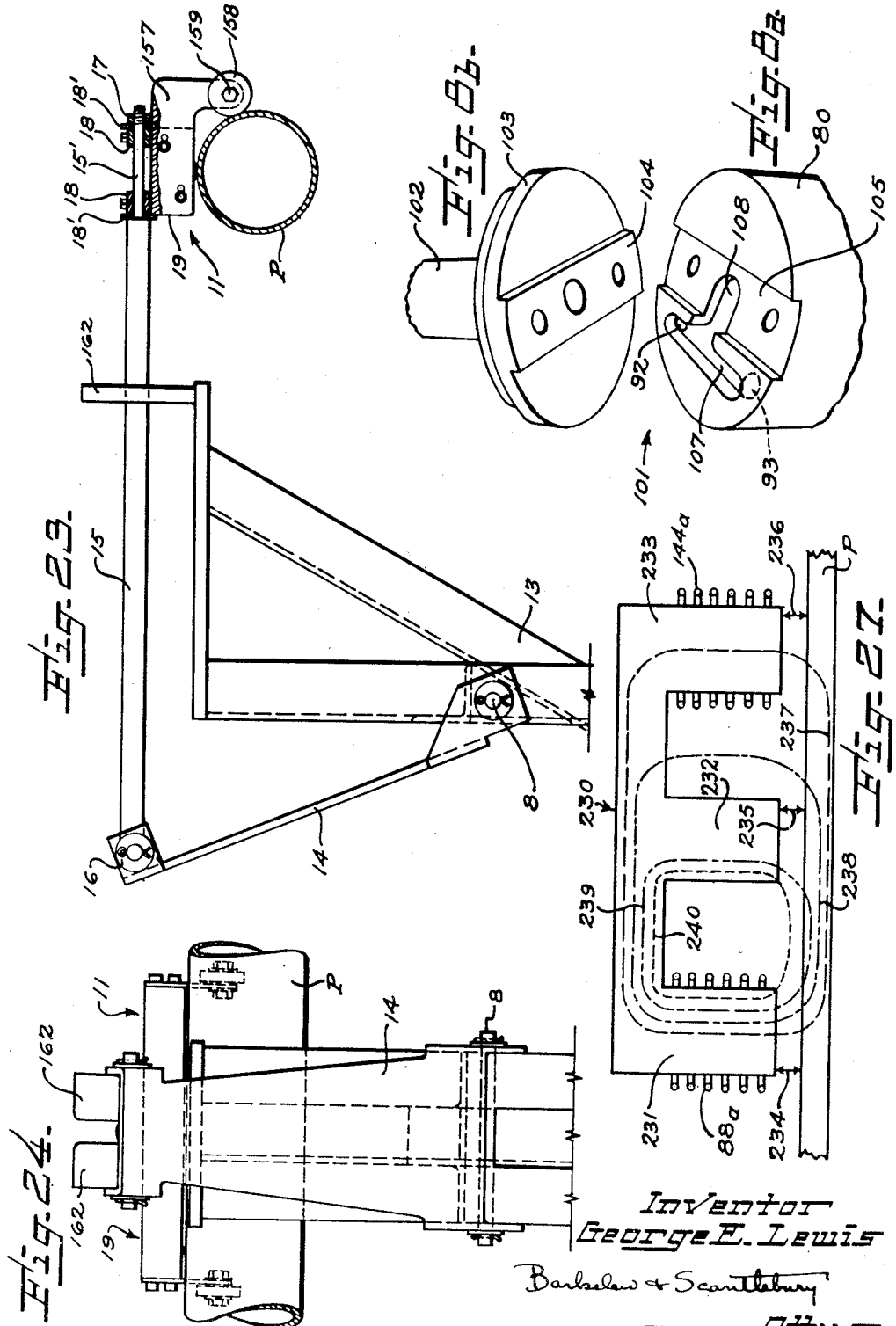

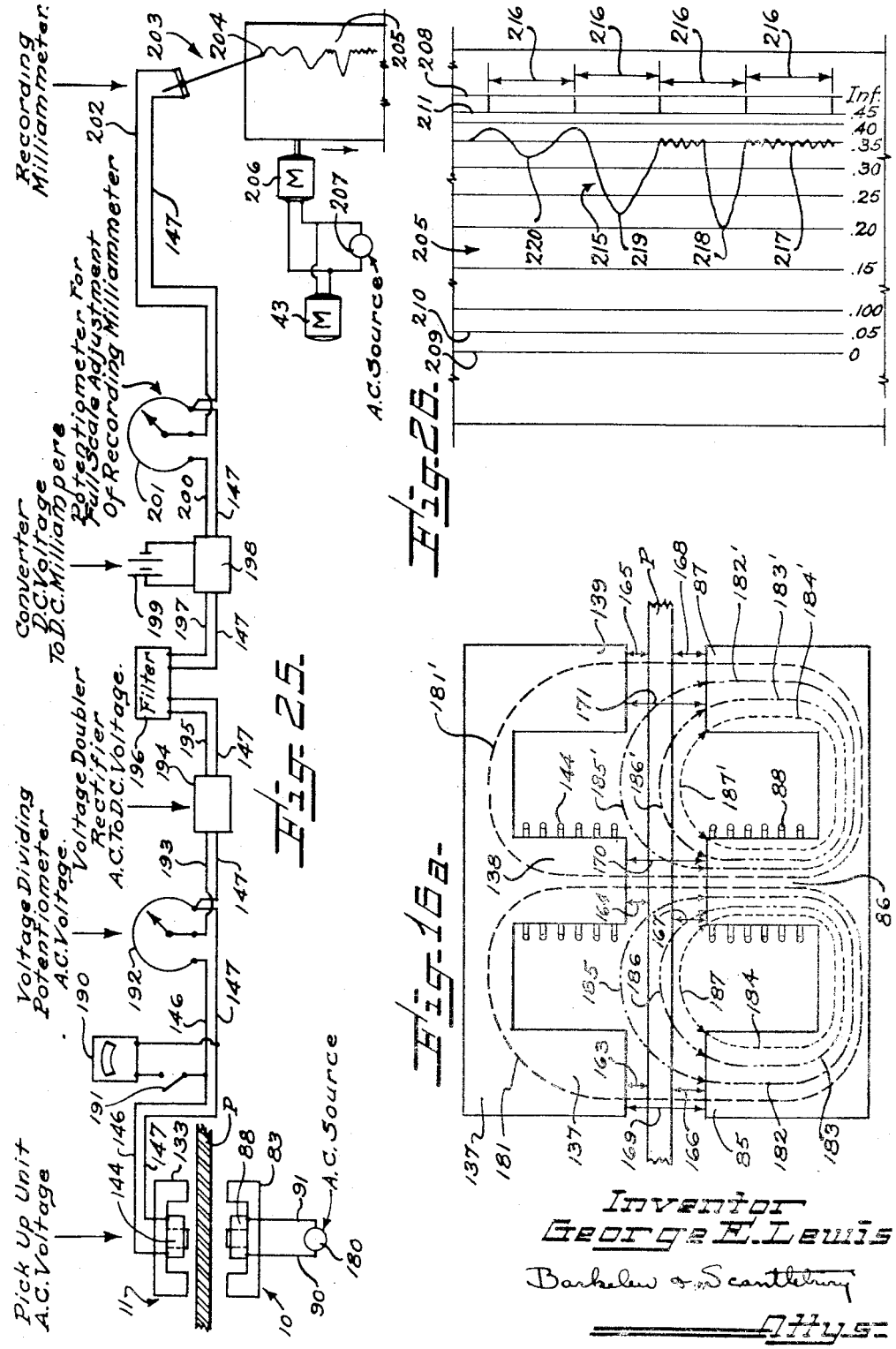

Patented Aug. 7, 1951

2,563,254

UNITED STATES PATENT OFFICE 2,563,254

THICKNESS INDICATOR

George E. Lewis, Alhambra, Calif., assignor to Hydril Corporation, Los Angeles, Calif., a corporation of California Application May 10, 1948, Serial No. 26,040

15 Claims. (Cl. 175—183)

This invention has to do generally with thickness indicators and is more particularly concerned with a method of and means for indicating the thickness of material by the use of magnetic flux. It has for its general objects the provision of highly accurate means for such measurement and having wide adaptability to work of different physical characteristics.

As distinguished from systems wherein the work passes through a fixed air gap between the pole pieces of an electromagnet, and the measure of work thickness is taken from a reading of the current flowing through the circuit, the present system involves the use of exciter and pick-up coils which are spaced apart but, in effect, "follow" the contour of the work, while air gaps of substantially fixed dimensions are maintained between the work and the coils.

As will appear, the exciter and pick-up coils may be disposed at opposite sides of the work or at the same side of the work, but in either case, when the exciter coil is energized by alternating current, portions of the resultant magnetic flux will flow through the work and a voltage will be induced in the pick-up coil. If the work be non-magnetic material and the coils are arranged at opposite sides of the work, the induced voltage will vary as a function of certain leakage losses and the leakage losses will vary as a function of the effective extent of the gap between the poles of the coils. Hence, a reading taken from a fluxmeter or other measuring device introduced in the induced circuit, may be interpreted in terms of work-thickness.

If the work be of a magnetic material, the above conditions prevail even if the coils be arranged at the same side of the work. When the work is of a magnetic nature, an added factor is involved for the work then acts as a shunt across the lines of magnetic flow. Thus, the voltage induced in the pick-up coil will depend upon the proportion of the flux which is shunted and that which passes through the work to the pick-up and back to the exciter coil. As the magnetic flux, in its travel, is thus necessarily affected by the metallurgical characteristics of the work and, if unguided, is free to seek its own paths of least reluctance, it is essential for fullest efficiency, that the flow be concentrated and guided, and for this purpose the coils are preferably provided with suitable cores.

Generally, the desired end is accomplished by producing magnetic flux varying between constant values at constant frequencies, establishing at least a pair of circuits for exciter-produced flux, wherein the magnetic reluctance of one circuit is greater than that of the other circuit, accommodating the material to be measured in a position where it is interposed in at least one of the circuits, and taking a reading from an indicator which is actuated by the flow in the said one circuit and is responsive in accordance with the instant value of the flux therein.

The described permissible relative arrangement of exciter and pick-up devices allows great latitude in adaptability of the system to the measurement of work having different shape-characteristics. The exciter and pick-up may or may not be physically connected, and, even when connected, they do not limit the range of application, as is the case where the pole pieces of the two elements are fixed against relative axial movement.

One of the most difficult types of work to handle is that of elongated tubular material, such as pipe, where it is desired to measure wall-thickness throughout its length, and I have therefore illustrated a preferred embodiment of my invention in that environment, though, in a broad sense, this is done purely for illustrative purposes and is not to be considered as limitative on the invention nor on the broader claims appended hereto.

As an even more particularized situation, the device is especially beneficial in the measurement of the wall thickness of well pipe. Here, it is highly important to know that a given section of pipe has no spots or sections where the wall thickness is less than that permissible for safe use under the highly critical and heavy-duty operating conditions to which pipe of this nature is exposed. Further, by taking thickness measurements at circumferentially spaced points about the pipe, the degree of eccentricity between inner and outer peripheral surfaces may be ascertained, this determination being important since the engineering standards of the field demand that the degree of eccentricity be not over a given value.

The device, in its preferred embodiment is adjustable to traverse the work only circumferentially, only axially, or spirally, and the mechanisms are such that they are easily and quickly appliable to and removable from the work. Also, the measurement operation takes but little time, which is an important feature where the total pipe-footage to be measured is of any considerable quantity. This is particularly true where a full string of well pipe is to be "surveyed," for the string must be out of service during the survey.

As a special feature, the entire mechanism is of such nature that it may be quickly "knocked down" for transport to different well sites and then quickly re-erected when the site is reached.

Other objects and features of novelty will be apparent from the following detailed description, reference being had to the accompanying drawings, in which:

Fig. 1 is a perspective view of an assembly incorporating my invention;

Fig. 2 is an enlarged, fragmentary view looking in the direction of arrow 2 in Fig. 1, but showing the pipe (being measured) in section;

Fig. 3 is a section on line 3—3 of Fig. 2;

Fig. 4 is an enlarged, fragmentary section on line 4—4 of Fig. 1;

Fig. 5 is a side view of the exciter unit with the pressure elements in inoperative positions;

Fig. 6 is a top plan view of Fig. 5;

Fig. 7 is an enlarged section on line 7—7 of Fig. 6;

Fig. 8 is an enlarged section on line 8—8 of Fig. 6;

Fig. 8a is a detached, fragmentary perspective of one of the elements of Fig. 8;

Fig. 8b is a detached, fragmentary perspective of another element of Fig. 8, which mates with the element of Fig. 8a;

Fig. 9 is an enlarged section on line 9—9 of Fig. 6;

Fig. 10 is a perspective of the pick-up unit;

Fig. 11 is a top plan view of the body-portion of the pick-up unit;

Fig. 12 is an enlarged section on line 12—12 of Fig. 11;

Fig. 13 is a section on line 13—13 of Fig. 11;

Fig. 14 is a section on line 14—14 of Fig. 11;

Fig. 15 is a reduced-scale top plan view of the entire assembly of the pick-up unit;

Fig. 16 is a fragmentary medial section taken through the central portions of the exciter and the pick-up unit when in the relative positions of Fig. 2;

Fig. 16a is a schematic view along the lines of Fig. 16, indicating flux paths in connection therewith;

Fig. 17 is a section on line 17—17 of Fig. 16;

Fig. 18 is an end elevation of the drive pipe-carriage;

Fig. 19 is a side elevation of Fig. 18;

Fig. 20 is an enlarged plan view, partly in medial section, of the pipe-supporting rollers of the carriage illustrated in Figs. 18 and 19, the view being rotated through 180° with respect to those figures;

Figs. 21 and 22 are perspective views showing the mating parts of an "escapement" appearing in Fig. 20;

Fig. 23 is an enlarged view of the pick-up supporting arm in association with the work and the pick-up unit;

Fig. 24 is a side elevation of Fig. 23;

Fig. 25 is a schematic wiring diagram;

Fig. 26 is a fragmentary view of a chart and a thickness-record impressed thereon; and Fig. 27 is a schematic view of an arrangement of the exciter and pick-up elements at the same side of a piece of work.

In Fig. 1 the exciter unit 10 and pick-up unit 11 are held in fixed relative positions axially of the work P, in this case a pipe, and the pipe is traversed by these units by bodily movement of the pipe. However, it will be understood the invention broadly embraces relative movement between the pipe and units where readings of relative wall-thickness are to be taken circumferentially about or longitudinally along the pipe, and therefore it matters not whether the pipe be stationary and the units move or the units be stationary and the work move. And, of course, the invention broadly contemplates the taking of a single thickness measurement, where there need be no relative movement between units and pipe involved.

Similarly, while the exciter and pick-up units are here respectively internally and externally arranged with respect to the pipe, the invention broadly includes a reverse arrangement and, in fact and as will be made apparent later, the exciter and pick-up coils may be arranged at the same surface of the pipe wall without departing from the spirit of the invention.

Without describing, at present, the details of the exciter and pick-up units, I will set forth the arrangements for supporting those units and the pipe and will describe the traversing means. Fixed to track 12 is a standard 13 to which is pivoted at 8 a swinging arm 14 (Figs. 23 and 24). Rod 15 is pivoted to arm 14 at 16 and has a reduced-diameter terminal portion 15'. Pick-up unit 11 has apertured lugs 18 to take rod-portion 15' in a manner whereby the unit is rotatable about the axis of the rod. The unit 11 is limited against excessive play axially of rod 15 by rod-washers 18' and nut 17, the latter further serving as means for demountably holding the rod and unit in assembly.

The exciter unit 10 is carried at the distal end of extension tube 20, the latter being made up of sections 21 detachably coupled at 9 (Fig. 4). Welded within the bore of one section 21 is one end of sleeve 22, the free end of the sleeve having slip-fit within the bore of the adjacent section 21. A ball bearing 23 is mounted on the sleeve between the abutting ends of sections 21, and the sections are detachably connected by screws 24.

The terminal tube-section 21a is adjustably clamped at 25 to post 26 secured to track 12. Depending upon the lengths of pipe P, the tube 20 is lengthened or shortened by adding or detaching the appropriate number of sections 21a and then the tube is finally longitudinally adjusted on post 26 to bring the pole pieces (to be described later) of the exciter and pick-up units in direct opposition or, more generally, to relatively fix the exciter and pick-up units in operating positions.

With the positions of the exciter and pick-up units thus fixed, means is then provided for supporting and moving the pipe in operative relation to said units. Preferably, though not necessarily, this pipe supporting and moving means, is adapted to move the pipe either or both rotatively and axially, the arrangement being such that, during compound movement, the timed relation of the rotating and axial movements is adapted to cause the exciter and pick-up units to traverse, in effect, a spiral path of uniform lead about and along the pipe.

For each cycle of operation, the pipe must be moved its length over the measuring units and then retracted a like distance. If all measurements were taken during one "pass" of the pipe, then the retractive movement would represent wasted time and, if the lead of the spiral were reduced to give a fuller reading, the full cycle would represent additional wasted time, unless the complications of a "rapid return" traverse were introduced. To gain the effect of a relatively close spiral and yet reduce the wasted time to a minimum without introducing rapid traverse complications, the pipe moving mechanism is arranged to take measurements during both the forward and reverse "pass," there being an automatically operated escapement which, upon reversing the direction of pipe movement (both circumferentially and axially) causes the coils of the return spiral to be axially offset with relation to those of the forward spiral, thus giving a thickness reading for points not included in the forward spiral pass. And, at the end of the reverse pass, the pipe is free for disengagement from the units, which are thereupon in condition to receive a new piece of work.

The pipe-supporting and moving means comprises a pair of trucks 25 and 26, detachably connected by tie bar 27, adapted to roll on track 12. Truck 25 carries idling rollers 28 which are similar to the roller 29 on truck 26, which latter is now to be described in detail.

Truck 26 is made up of a bed 30 supported on the axles 31 and 32 of wheel-pairs 33 and 34, respectively, axle 31 being a "live" axle journaled at 35 on the bed and being drivingly connected to wheels 33. Uprights 36 from bed 30 support a transverse box-frame 37 (Figs. 18 to 21) in the side plates of which are journaled the shafts 39 and 40 of rollers 29 and 41. These rollers are keyed to their respective shafts and are provided with bonded rubber rims 42 of the same effective diameters. Roller 29 is an idler, whereas roller 41 is driven through its shaft 40. The drive to shaft 40 comes from a reversible motor 43 on bed 30, through the following transmission. Motor 43 drives sprocket 44 through shaft 45 and speed reducer 46, this sprocket being drivingly connected to sprocket 47 by chain 48. Sprocket 47, in turn, is keyed to shaft 49 which is journaled at 50 on bed 30. Also keyed to shaft 49 is a sprocket 51 which is connected by chain 52 to a sprocket 53, the latter being mounted for rotation, of limited angular extent, on roller shaft 40 (Fig. 20).

An escapement or lost-motion connection between sprocket 53 and shaft 40 is indicated generally at 54, and is made up of two mating elements 55 and 56 (Figs. 20, 21 and 22). Element 55 comprises a hub portion 57, keyed to shaft 40 at 58, and an interrupted drum or annular flange 59. The interruption of the drum provides angularly spaced shoulders 60, 61 which lie in planes which are radial with respect to the drum. Element 56 comprises a ring 62 removably coupled to the hub 63 of sprocket 53 by set screw 64, the ring having a radial lug 65 whose faces 66 and 67 lie in planes which are radial with respect to the ring. The body portion of ring 62 is taken within flange 54 of element 55, while lug 65 lies between shoulders 60, 61, the angular extent of the lug being less than the angular spacing of said shoulders, so ring 62, and hence sprocket 53, are capable of limited rotation with respect to element 55 and shaft 40. By substituting rings having lugs of different angular extents or drums with differently spaced shoulders, the extent of this relative rotation or "lost-motion" may be varied to alter the starting point of the reverse spiralling of the instrument "track" with respect to the finish point of the forward spiralling of that track, as will presently appear.

Shaft 49 also carries a keyed bevel pinion 70 which meshes with bevel gear 71 on shaft 72, the set screw 73, or equivalent coupling, enabling the operator selectively to drivingly connect the gear to the shaft or to interrupt the transmission of driving force at this point. If disconnected, the motor is adapted only to rotate the pipe P to take circumferential readings throughout a given transverse plane of that pipe; while, if gear 71 is drivingly connected to shaft 72, the motor is adapted to drive shaft 72 in timed relation to the rotation of pipe P. Shaft 72, in turn, is drivingly connected to axle 31, and hence to traction wheels 33, by the chain and sprocket transmission 74, or if the rate of longitudinal travel of the carriage and pipe is to be increased with respect to given angular velocity of the pipe, the operator may shift the chain of transmission 74 to the sprocket-set 75.

Thus, when motor 43 is energized, the truck 26 (and, with it, truck 25) immediately starts to travel along track 12, thus moving pipe P axially with respect to units 10 and 11. As soon as lug 65 engages one of the shoulders 60 or 61, the motor, through escapement 54, starts to rotate roller 41 and hence the pipe P, the axial and circumferential movements of the pipe being in predetermined time relation. Accordingly, continued operation of the motor in the same direction, causes the exciter and pick-up units to traverse, in effect, a spiral path along and about the pipe, the lead of the spiral being determined by the relative speeds of axial and circumferential movement of the pipe. The angular velocity of the pipe depends not only upon the sprocket ratios in the motor-to-roller transmission, but also upon the diameter of the pipe. If, therefore, it be desired to maintain given angular velocity, in spite of the fact that a pipe of different size is substituted, it is necessary to change the sprocket ratios.

In the illustrated case, the sprocket and pipe ratios are such that there is one revolution of the pipe to 2 inches of axial travel, giving a spiral lead of 2 inches. It will be seen that this lead may be varied by changing any or all of the sprocket or gear ratios in the drive transmissions at points beyond sprocket 47, or by changing the diameters of rollers 29, 41, for roller 41 is, in effect, part of the drive-transmission to the pipe.

When the pipe has been moved axially a sufficient extent to bring the exciter and pick-up units to the end of the zone to be calibrated, the motor 43 is reversed and the trucks, and hence the pipe, immediately start to move axially in a reverse direction. However, while sprocket 53 immediately starts to rotate reversely, its drive is not transmitted to shaft 40 until lug 65 engages that shoulder 60 or 61 which was previously spaced angularly from the lug. Accordingly, the reverse spiralling of the track does not start until the lost-motion of escapement 54 is taken up, and the beginning point of this return spiral track and the "coils" of that track will be axially and angularly displaced with respect to the end "coils" of the forward spiral track. However, the lead of the reverse spiral will be the same as that of the forward spiral and the "coils" of the two spirals will be parallel.

In the illustrated embodiment, the relative angular extents of lug 65 and the drum-interruption represented by the spacing of shoulders 60, 61 is such that the pipe has one inch of reverse axial travel, before reverse pipe-rotation starts, it following that the "coils" of the reverse spiral are mid-way between the "coils" of the forward spiral. By varying the extent of lost motion in the escapement, the relative positions of the forward and reverse "coils" may be varied at will.

If it be desired to take readings longitudinally along the pipe but not circumferentially thereabout, the chain 52 may be detached from sprockets 51, 53, so drive is transmitted only to wheels 33. Or, of course, if "spot" readings, only, are to be made, the truck may remain stationary during the takings of the individual readings.

The body 79 of exciter 10 is made up of a cylinder 80 of non-magnetic and, preferably, non-conducting material, having a central elongated through-slot 81 to take the transformer-iron laminations 82 making up the core 83, the laminations being adjustably clamped within the slot by screws 78 (Fig. 17). Though this is not limitative, the core 83 is E-shaped (Fig. 16), the bar portion of the core being indicated at 84 and the three poles at 85, 86 and 87. The exciter coil 88 encircles the central pole 86, the cylinder 80 being cut away at 89 to form a cavity to receive the coil. Lead wires 90, 91 run from the coil through channels 92, 93 to one end of body 80, where they join to form a cable 94.

Enclosing cylinder 80 is a tube or barrel 95 of non-magnetic and, preferably, non-conducting material, the tube being detachably held to the body by screw 96 (Fig. 6). Core 83 is adjusted within the body-slot 81, and then releasably locked in that adjustment by screws 78, to associate the free ends of poles 85, 86 and 87 in proper relation to the inner peripheral face of tube 95. Although this is not limitative, in the illustrated embodiment this association is such that the ends of poles 85, 86 and 87 are equally spaced from that face as at 97, 98 and 99, respectively, these spaces and the distance represented by the thickness of the tube being factors in determining the effective "gap" between the exciter poles and the work, as will appear.

Body 79 also includes roller and spacer assemblies 100 and 101 which may be identical, except that assembly 101 is especially fabricated to accommodate cable 94. I will therefore describe assembly 101 without repeating that description insofar as it applies to assembly 100. Similar parts will be given the same numbers, except those of assembly 100 will carry the subscript "a."

Assembly 101 (Figs. 8, 8a, 8b, and 9) includes a tubular shaft 102 having a flange 103 provided with a diametrically extending lug 104 (Fig. 8b) on its forward face adapted to be taken in a complementary groove 105 (Fig. 8a) in the end of cylinder 80, the flange and cylinder being detachably connected by cap screws 106. The end of cylinder 80 (Fig. 8a) has a cross-groove 107 connecting the ends of channels 92 and 93 and opening to channel 108, the end of the latter registering with the bore 109 of tubular shaft 102. Cable 94 runs through bore 109 and into channel 108, the leads 90 and 91 then dividing in channel 107 and thence running through their individual channels 92 and 93.

A sleeve 110 having an enlarged flange 111 is mounted for rotation on shaft 102 through ball bearing 112, while a ring 113 is mounted on the shaft-carried ball bearing 114, the ring being centrally apertured to fit shaft 110. Flange 111 and ring 113 have opposed and oppositely inclining conical faces 115 and opposed, square-cut faces 116, between which is taken the roller 117, the latter being mounted on sleeve 110.

A head 118 fits on the free end of shaft 102 and a socket-headed tubular bolt 119 is threaded into the bore of shaft 102, the head 120 of the bolt engaging the face of the ring in a manner tending to cause it to shift bearing 114 and ring 113 to the left in Fig. 9. This force acts through roller 117 to move flange 111 and bearing 112 to the positions of Fig. 9 and clamps roller 117 between faces 116. Sleeve 110, flange 111, roller 117 and head 113 are thus held together in a manner to rotate as one about shaft 102, the end clearances between flange 111 and flange 103 and between ring 113 and head 118, being sufficient to prevent binding and yet sufficiently small and tortuous to greatly reduce the danger of foreign matter reaching bearings 112 or 114.

Preferably, though not necessarily, roller 117 is made of relatively stiff rubber or the like, it being sufficiently rigid to prevent undue diametrical deformation and thus preserve certain space-relationships and yet being flexible enough to twist locally out of its plane sufficiently to enable it, in effect, to follow a spiral path with the full width of the peripheral face of the roller engaging the inner peripheral face of the pipe P.

Rollers 117 and 117a are of greater diameter than are flange 111 or ring 113, and, in fact, represent the greatest overall diameter of body 79. As will appear, the body is thrust diametrically of the pipe to hold rollers 117 and 117a in constant engagement with the pipe and they thus become factors (with the spaces 97, 98 and 99) in determining the effective extent of the gap between the exciter poles and the work.

I will now describe the means I employ for constantly holding rollers 117 and 117a engaged with substantially constant force against the inner peripheral face of pipe P and hence cause the poles of the exciter to "follow" that face with substantially constant spacing therefrom. As will be seen, the arrangement is such that the exciter may be used with pipes having internal diameters which vary between relatively wide limits.

Generally, this means comprises pressure "shoes" or expanders 122 and 123 connected to opposite ends of body 79, which shoes are adapted to engage the inner peripheral face of the pipe at points 180° removed from the points of contact of rollers 117 and 117a of the body member. Between the body and shoes are introduced linkages and springs which tend relatively and yieldingly to spread the body member and shoes in a common diametral plane of the pipe and thus hold the rollers and shoes in engagement with the pipe at diametrically opposite points in spite of changes in pipe diameter.

Shoes 122 and 123 are similar to the roller assemblies 100 and 101 and therefore need not be described in detail. However, corresponding parts are given similar reference numerals plus the subscript "b." It is the rollers 117b which represent the overall diameters of the shoes and which, therefore, engage the pipe.

Parallel links 124 pivotally connect the head 118 of roller assembly 101 with head 118b of shoe 122, springs 126 connecting diagonally opposite link-pins 127 in such a manner that the springs tend to move the shoe 122 from the position of Fig. 5 to the position of Fig. 2. Similarly, parallel links 124b connect the head 118a of roller assembly 100 with head 118 of shoe 123, springs 126b connecting diagonally opposite link-pins 127b in such a manner that the springs tend to move the shoe 123 from the position of Fig. 5 to the position of Fig. 2. Thus, shoes 122 and 123 are independently movable radially of the pipe but always remain axially parallel to body 79, the springs always maintaining the rollers 117 and 117a in engagement with the pipe in spite of the fact that the inside diameter of the pipe may vary at the two points of body-roller engagement. The rollers 117, 117a and 117b will yield sufficiently to maintain substantially full roller-width engagement with the pipe in spite of the fact that the axes of the body member and shoes may not be parallel to the pipe-axis due to slightly tapering characteristics of the pipe-bore.

Flange 103b of shoe 122 is lengthened and counterbored to provide a socket 128 to receive the end of a section 21 of tube 20, the section and flange preferably being weld-connected at 129 (Fig. 9). Flange 103b of shoe 123 is enlarged and rounded to provide a nose 130 to facilitate entry of the device to the bore of tubular work.

Pick-up unit 11 includes a body member 19 made up of symmetrical, rectangular blocks 131 of non-magnetic and, preferably non-conducting material, the blocks being held together by bolts 132.

The core of the pick-up device is indicated generally at 133, being made up of E-shaped transformer-iron laminations 134 which are clamped within the body-slot 135 (Fig. 11) by bolts 132. The core consists of a bar-portion 136 (Figs. 10 and 16) and pole-pieces 137, 138 and 139, the pole-pieces extending to points below the bottom surface 140 of blocks 131 (Fig. 14). The outer laminations at the free end of central pole 138 are preferably, though not necessarily, cut back to provide a relatively narrow central portion 141 (Figs. 10 and 14) for reasons to be discussed later.

Wrapped over the top and sides of pole 138 is non-magnetic metal strip 142, the block-slot 135 being cut back at 143 (Fig. 11) to accommodate this strip, and the pick-up coil 144, encircling pole 138, is received in the body-recess 145 (Fig. 14) wires 146 and 147 being led from the coil through body-channels 148' (Fig. 12) to the exterior of pick-up 11. Coil 144 is held within recess 145 by a plate 146' of non-magnetic and, preferably, non-conducting material, which plate extends from outside pole to outside pole (Figs. 10 and 14) the plate, in turn, being held up by the bent-over tongues 147' of strip 142.

I will now describe the means for adjustably establishing the gap between the outer peripheral surface of the pipe and the free ends of poles 137, 138 and 139. This means comprises, in general, roller-assemblies 148 near opposite ends of body 19. The assemblies are identical and, normally, are set identically, so a description of only one will suffice. A vertical, cylindrical plug 149 is mounted in body 19 for rotation about a vertical axis, the lower end of the plug being forked to receive roller or "shoe" 150 which is rotatable on pin 151 carried by fork-arms 152. Held to the top of plug 149 by central screw 153 is a clamp disk 154 which is held to the top surface of body 19 by clamping screws 155. By loosening screws 155 and rotating plug 149, roller 150 may be adjusted to vary its plane of rotation. Where the relative travel of pick-up and pipe is solely circumferential, the roller may be advantageously set so its plane of rotation is normal to the pipe axis; where the relative travel is solely longitudinal, the roller may be advantageously set so its plane of rotation is parallel to the axis of the pipe; while if the relative travel is spiralled, the roller may be set so its plane of rotation is appropriately angled.

The roller assembly is such that the roller 150 extends below the ends of poles 137, 138 and 139, and since the roller constantly engages the outer peripheral surface of the pipe, it, with the companion roller at the other end of the pick-up body, serves to establish the extent of the air gap between the work and said poles. By providing shims 156 of appropriate thickness between disks 154 and the upper ends of plugs 149, the extent to which rollers 150 project below the ends of the poles may be varied, thus providing adjustable means for establishing the extent of the air gap between the pole-ends and the work.

In order to keep the pick-up unit 11 centered over the pipe and to maintain the pick-up poles 137, 138 and 139 in transverse vertical alinement with poles 85, 86 and 87, respectively, of exciter 10, I provide body 19 with replaceable or adjustable side arms 157 which carry rollers or "shoes" 158 on axes 159. The weight of arm 14 tends to draw rod 15 and pick-up 11 to the left in Fig. 23, the engagement of rollers 158 with the pipe P limiting this left-wise movement. The rollers are so positioned with relation to the vertical axial plane of body 19 that, when they are applied to a pipe P of given diameter by the drag of rod 15, they assure the described alinement of the poles of the exciter and pick-up. When the pipe and pick-up are to travel a relative spiral path, arms 157 may be bent (for instance, as shown in Fig. 15) to angle the planes of wheel-rotation so the wheels may "track" more readily. Arms 157 are detachably secured to body 19 by bolts 160 and may be provided with holes 161 whereby the arms may be shifted to adapt the roller-positions to pipes of different diameters. Or, of course, arms 157 may be replaced by other arms which support rollers for engagement with pipes of different given diameters.

Rod 15 holds pick-up 11 in fixed position in the direction of the pipe axis, guides 162 on stand 13 holding the free end of the rod and the pick-up against displacement in this direction but not interfering with the free rise and fall of the pick-up as the latter is traversed by the pipe. Also, the rotational mounting of pick-up 11 on rod 15, allows the pick-up to "rock" in a manner to enable both rollers 150 constantly to engage the pipe throughout the traverse.

From the above it will be seen that whether the pipe be stationary or moving, the ends of pick-up poles 137, 138 and 139 are held in substantially uniform and constantly spaced relation with respect to the outer peripheral surface of the pipe, and the ends of exciter poles 85, 86 and 87 are held in substantially uniform and constantly spaced relation with respect to the inner peripheral surface of the pipe. Accordingly as the pipe is moved longitudinally or circumferentially, the only variable in the effective gaps between opposed pole pieces is the thickness of the intermediate pipe-wall.

For purposes of future reference, the gaps between the work and poles 137, 138 and 139 are designated as 163, 164, and 165, respectively; the effective gaps between the work and poles 85, 86 and 87 are designated as 166, 167 and 168, respectively; and the effective gaps between opposed poles 137—85, 138—86 and 139—87 are designated as 169, 170 and 171, respectively.

The alternating voltage applied to exciter coil 88 from source 180 (Fig. 25) is held at a substantially constant value and frequency, the value of the voltage being sufficiently low to prevent magnetic saturation of magnetic materials in the flux paths. Accordingly, the alternating, exciter-produced flux will be of substantially constant value. For purposes of simplicity, we will hereinafter refer to this value as "total" flux. The flux, as it proceeds from the central pole of the exciter coil back to the other poles thereof, traverses various paths, the greater proportion of the flux traversing the path of least reluctance.

In discussing the theory of operation, we will consider that portion of the total exciter-produced flux which will induce a voltage in pick-up coil 144 as the "secondary" flux. "Primary" magnetic flux is to be considered as the total exciter-produced flux minus the "secondary" flux. There are path-sections which are common to the primary and secondary fluxes.

The exciter 10 and pick-up 11 are so fashioned and relatively arranged that the reluctance of the secondary flux path is always greater than the combined reluctances of the several primary flux paths, taken in parallel and, accordingly, the value of the secondary flux is always less than the value of the primary flux.

Gaps 169, 170 and 171 have portions which are common to the secondary flux path and to one or more (but not all) of the path-parts which make up the primary flux path. If the mean extent of the gaps be increased a given amount, the value of the secondary reluctance is increased a given amount. Since the flux varies inversely as the reluctance, the given increase in gap extent causes a given decrease in the value of the secondary flux; or more generally, variations in mean gap extent cause relatively inverse variations in the value of the secondary flux.

It is a feature of my invention that measurement of work of varying thickness is accomplished, in effect, by measuring variations in the secondary flux as the work is being traversed; for, with the total flux remaining constant and with the secondary flux always less than the primary flux, a given change in gap-extent causes a greater percentage change in the secondary flux than in the primary flux. The benefits resulting from taking work-measurements from the flux circuit having this percentage-change-advantage, will be readily seen. Thus, variations in the secondary flux circuit indicate variations in gap extents, and, by calibrations based on the secondary-flux-response with one or more known gap values, other responses serve to indicate the linear extents of gaps having other values.

Since an increase in gap extent causes a decrease in the secondary flux, the reading of ascending flux values would have to be taken as indicating descending gap-values, if no rectifying steps be taken. To avoid the confusion which might arise from this situation, I prefer to introduce, in the output circuit of the pick-up coil, a device which inverts the response, so an increase in gap-extent is indicated by an increase in the response of the device, as will later be more fully described. The inverter gives other advantages, but these will not be discussed until later.

So far I have spoken only of the effect of changing the extents of gaps 169, 170 and 171 and the measurement of those gaps when varied in extent. Obviously, if the exciter and pick-up units be engaged with opposite sides of the work, as in Fig. 16, the thickness of the work is a determining factor in the extents of those gaps for, as the thickness of the work varies, so also do the extents of the individual gaps. Therefore, measurement of changes in gap-extent, as brought about by varying thickness of the work, may be interpreted as measurement of changes in work-thickness.

It may be stated as a general proposition that it is advantageous to keep the over-all "constants" of the system as nearly truly constant as possible. There will be certain unavoidable variables in the magnetic circuits due to surface conditions of the work which have the effect of varying the extents of the air gaps between the work and the pole-faces of the units. In order to keep the extent of such gap variations as small as possible compared with the extent of the gap as predetermined by the relative setting of the core poles and work-engaging rollers, the "predetermined" air gaps are preferably made large as compared with normal local surface variations. To be more specific, such irregular local surface conditions of the work have the effect of varying the extents of over-all gaps 169, 170 and 171, which cause a related variance in the magnetic flux in the pick-up coil 144. This variance, as it is reflected in the desired indication of average thickness of the instant field of exploration, represents an error, but by establishing, through rollers 150 and 117, relatively fixed mean air gaps 163, 164, 165 at the pick-up side and air gaps 166, 167 and 168 at the exciter side, of such extent that the percentage changes brought about in these gaps by such local surface irregularities are relatively small, the error is reduced to a negligible amount.

All the above applies whether the work be dielectric or not. If the work be conductive but non-magnetic, eddy currents are induced therein, these currents acting as a shield which reduces the amount of flux passing through the secondary flux circuit; and the thicker the work, the greater is the shielding effect. This effect is additive with respect to the above described effect resulting from an increase in the mean over-all extent of gaps 169, 170 and 171, and thus increases the unit flux change per unit of increased work-thickness, which is of obvious advantage.

If the work be magnetic, we not only have the benefit of the above effects, but we have the added benefit resulting from the fact that the work becomes a magnetic shunt operating in parallel with the secondary circuit, and the thicker the work, the lower is the reluctance of this shunt and the less is the amount of flux passing through the secondary flux circuit.

When the work is conductive (magnetic or not) other considerations are taken into account. Variances in the mean extent of gaps 163, 164 and 165 remain relatively critical, as with dielectric work, for they are relatively critically reflected in the reading of the secondary flux values. But variances in the mean extent of gaps 166, 167 and 168 become less critical because of the shielding effect of the conductive work. These latter gaps are at the exciter side of the shield and therefore changes in their mean extent do not materially change the ratio of the secondary flux to the primary flux, and, since the total flux is constant, they do not materially change the secondary flux—which is the flux utilized for giving the thickness reading.

The greater the shunting effect of the work, the less is the unit change in the secondary flux per unit change in the mean extent of gaps 166, 167 and 168, and therefore the less become changes in that extent. Therefore, when the work is magnetic, changes in the extents of these gaps are correspondingly less critical than when the work is non-magnetic. If the work be conductive (magnetic or not) the greater its thickness the greater is its shielding effect. Therefore the greater the thickness of the work, the less critical become the changes in the extents of gaps 166, 167 and 168.

Since the pole-to-work spacing 163, 164, 165 of the pick-up circuit is relatively critical to the accuracy of thickness measurements, it is preferable that the pick-up 11 be applied to that side of the work which may be easily cleared of dirt or local foreign protuberances—for instance the outside of pipe P. Furthermore, local variations in the pipe surface, may be seen and therefore taken into account when thickness readings are made.

On the other hand, since the pole-to-work spacing 166, 167, 168 of the exciter unit is not highly critical when the work is of conductive or magnetic nature, the exciter 10 may well be located in the pipe bore, for unseen or unremovable minor local surface irregularities have relatively little effect on the accuracy of the thickness measurement. However, it is to be distinctly understood that the above discussion is not to be taken as limitative on the relative placement of the exciter and pick-up units.

As an example of suitable spacing where wellpipe of about .375" wall thickness is being measured and the outside diameter of exciter barrel 95 (Fig. 16) is about 2", gaps 163, 164 and 165 may each be about .07" in vertical extent, and the gaps 166, 167 and 168 may each be about .25" in vertical extent. However, it is to be understood that these dimensions and their proportionate values are in no way to be considered as limitative.

The exciter coil 88 is energized by a current having an alternating component of constant voltage. For instance, as in Fig. 25, coil 88 may be excited by a current supplied from an alternating current source 180 having a constant 120 volt, 60 cycle output. Accordingly, coil 88 will produce a constant "total" flux.

In the immediately following discussion I refer to typical flux paths indicated in Fig. 16a, the indicating lines each representing a group of such paths. Obviously, there are many un-indicated paths, but reference to the indicated groups will suffice for the present purpose. The algebraic sum of the values of the flux flowing through these group paths will be considered as equal to the said constant "total" flux.

For purposes of simplicity, it will first be assumed that only poles 85, 86 of the exciter unit and only poles 137, 138 of the pick-up unit are involved. Line 181 represents the path of the secondary flux, and this path passes twice transversely through work P. Line 182 represents a path of primary flux which passes twice transversely through work P; line 183 presents a path of primary flux which passes longitudinally through work P; and line 184 represents a path of primary flux which avoids the work P entirely. The "total," or exciter-produced, flux may be considered as that which passes through all the indicated paths, the total "secondary" flux as that which passes through path 181; and the total "primary" flux as that which passes through paths 182, 183 and 184. It will be seen that gaps 169 and 170 have portions which may be common to secondary flux path 181 and primary flux paths 182 and 183, but these gaps have no portions which are common to secondary path 181 and primary path 184, which latter may be considered as a leakage path.

As has been said, the reluctance of the secondary flux path is to be greater than the total reluctance of the combined primary flux paths. If the work be dielectric, or conductive but non-magnetic, the vertical spacing of the opposed poles 86—138 with relation to the spacing of poles 85, 86 longitudinally of the work is the most easily controlled factor for bringing about this condition. Accordingly, when adapting the device to such material, the cores are so fashioned that the spacing of poles 85, 86 longitudinally of the work is less than the sum of the extents of gaps 169 and 170 when the device is applied to work of minimum thickness within the range to be measured. The reluctance of gap 169 plus the reluctance of gap 170, plus the reluctance of the pick-up core is always greater than the algebraic sum of the reluctances of the gaps represented by portions 185, 186 and 187 of paths 182, 183 and 184, respectively, these gap-portions being in parallel. The exciter core, itself, is common to paths 181, 182, 183 and 184 and hence presents reluctance of given constant value to each of those paths. Therefore, since the remaining portion of path 181 has a reluctance greater than the algebraic sum of the remaining portions 185, 186 and 187 of paths 182, 183 and 184, respectively, there results the desired effect of always maintaining the reluctance of the secondary flux path 181 at a higher value than that of the total reluctance of the combined primary flux paths 182, 183 and 184.

On the other hand, if the work be magnetic, as may be the assumption in Figs. 16 and 16a, the work acts as a shunt which decreases the reluctance of primary path-part 186 and, since path-parts 185 and 187 are in parallel therewith, decreases the total reluctance of the combined primary paths. However, the eddy current effect of the magnetic work increases the reluctance of secondary path 181 where it passes twice transversely through the work. Accordingly, the desired ratio of secondary reluctance to primary reluctance may be maintained even though the spacing of poles 85, 86 longitudinally of the work be increased over that which is essential for measurement of dielectric work. The greater the magnetic permeability of the work, the greater may be the spread between poles 85, 86.

As is apparent, the fashioning of the device to maintain the specified relationship between primary and secondary reluctances, insures that the secondary flux will always be less than the primary flux and, as explained, it is the secondary flux which is measured to indicate work-thickness.

So far, we have considered the exciter and pick-up cores as having only two poles, each, that is, as though they were U-shaped. Were the coils 88 and 144 then to be arranged on the bases of the U's, the value of the secondary flux would represent the mean thickness of the work at gaps 169, 170.

However, it is preferred to utilize E-shaped cores, with the coils about the central legs, as illustrated. In Fig. 16a, the flux paths which traverse poles 87, 139 are indicated by lines which have the same numerals, plus prime marks, as the corresponding paths through poles 85, 137, and the above discussion with regard to the paths through poles 85, 137 is to be considered as applied also to the right hand side of the system. However, it will be seen that, since the flux is produced within the central pole 86, the actual effect is that the exciter produced flux will divide as it leaves this pole, part going through the left hand paths and part through the right hand paths. The advantage of this arrangement is that the central pole becomes more critical because all the secondary flux traverses the work at central gap 170, whereas lesser amounts traverse the work at gaps 169 and 171. Of course, variations in the thickness of work at gaps 169 and 171 will modify the thickness indication at gap 170 to some extent, but to a much lesser extent than would be the case if cores were U-shaped and therefore all the secondary flux traversed the work at both gaps. To further reduce this modifying effect, the central pole 138 of the pick-up core is fashioned with central portion 141 presenting a relatively narrow pole face to the work (Figs. 10 and 14) this having the effect of reducing the area of the work from which the flux is gathered by the central pole of the pick-up core, so this pole is more sensitive to thickness variations than are poles 137, 139. The modifying effect is reduced to such an extent that the secondary flux response may, for practical purposes, be considered as reflecting the thickness of the work at the central poles, and such consideration may be applied throughout the following discussion.

With it thus apparent that the value of the secondary flux depends upon the thickness of the work within the effective range of units 10 and 11, it will be seen that, by proper calibration, a measure of that flux may be used as a measure of work-thickness and, where the work varies in thickness, a measure of the change in secondary flux may be used as a measure of changes in work-thickness. This measure of secondary flux may be accomplished through the introduction of any suitable fluxometer in the secondary circuit. Preferably, though not necessarily, the fluxometer is associated with a recording device including a chart-tape which is driven in timed relation to the relative movement of the exciter and pick-up, as a unit, and the work. I will proceed to describe the illustrated means for accomplishing this end, though this is not to be considered as limitative on the broader aspects of the invention.

Lead wire 146 and ground wire 147 extend from pick-up coil 144 toward the various indicating and/or recording devices. A voltmeter 190 may be introduced in the circuit, by closing switch 191, the meter responding to changes in the value of induced voltage as brought about by changes in work thickness. By proper calibration and marking of the voltmeter, direct readings of work thickness may be taken from the meter, or the meter readings may be correlated with charted information so a reading of voltage may be converted to a reading of work-thickness. However, it is preferred to extend the indicating system in the manner to be described and, when the extended system is used, switch 191 should ordinarily be open so the voltmeter consumes no energy.

Wires 146 and 147 are extended to A. C. voltage dividing potentiometer 192 whereby the induced voltage may, at this point in the circuit, be modified for calibration purposes. For instance, if the induced voltage is of given value with one sample of work of given thickness, while the induced voltage is of different value with another sample of work of the same thickness (as may be true when the samples have different metalurgical characteristics) the potentiometer may be adjusted to give a common response at its output side. And, as will appear later, the potentiometer may be used in establishing the zero position of the record marker.

From potentiometer 192, wires 193 and 147 extend to voltage-doubler rectifier 194, whereby the A. C. voltage from the pick-up coil is rectified to pulsating D. C. voltage. Wires 195 and 147 lead to filter 196 which, for a given input of pulsating D. C. voltage, delivers a non-pulsating D. C. voltage of constant value.

From filter 196, wires 197, 147 lead to converter-inverter tube circuit 198, powered by battery 199, in which the rectified and filtered D. C. voltage is used to control the output current of the converter tube which supplies D. C. current to wires 200 and 147. The control is such that a decrease in the numerical value of the rectified and filtered D. C. voltage, causes an increase in output current in wires 200 and 147. Accordingly, an increase in work thickness (which decreases the voltage in wires 197 and 147) causes an increase in the current in wires 200 and 147.

If linear, or near-linear, chart-characteristics are sought, the curve representing the current changes in wires 200, 147 should be as nearly as possible complementary to the curve representing the voltage changes in wires 146, 147. To accomplish this, a tube for circuit 198 is chosen whose current-change response will most nearly complement the voltage-change response resulting from the particular material being measured.

Frequently, in practice, a perfect complement is not necessary, for the chart calibrations may be matched to a test-established response curve. For example, the control-grid voltage vs. the plate-current response of a 6–SK–7, variable mu tube sufficiently closely complements the response from the pick-up unit, when the work is of the nature of oil well drill pipe, to allow the use of a chart scale which is very nearly linear through a given working range.

As a matter of fact, where a certain region of the response curve is of particular interest, it is sometimes of advantage to select a tube for circuit 198 which spreads the response variation per unit work-thickness variation in that region; or to accomplish the spread as by applying a fixed bias on the tube control-grid.

From tube circuit 198, wires 200, 147 lead to potentiometer 201, from whence wires 202 and 147 lead to recording milliammeter 203, made up of a marking element 204 actuated by current in wires 202, 147, a tape-chart 205, and a motor 206 for driving the chart at constant speed and in timed relation to the movement of the pipe P as caused and controlled by motor 43 (Fig. 19). If desired, motors 43 and 206 may be driven synchronously from a common source 207, but in any event the relative speeds of the pipe-movement and chart-movement are such that a given linear extent of chart-movement represents a known extent of pipe movement, considered either or both from the standpoints of circumferential or axial movement of the pipe. Accordingly, with the marker starting at a given point on the chart and the pick-up unit 11 starting at a given point on the pipe, coincident movement of the pipe and chart produces a record on the chart which allows the operator readily to locate corresponding points on the pipe and the record. Ordinarily, of course, given linear extent of the chart represents a much greater linear extent of pipe, but the extents are always of known proportion.

The chart (or a transparent reading templet—not shown) is preferably, though not necessarily, ruled in the general manner indicated in Fig. 26. Here, the line 208 represents infinite work-thickness, and line 209 represents zero work thickness, with the intermediate lines representing intermediate work thicknesses, as determined by readings made from test pieces of known thickness. For instance, line 210 represents .05" work-thickness and line 211 represents .45" work-thickness, while the remaining lines indicate the thickness individually marked along the lower edge of Fig. 26. This pre-supposes that we are interested in a range from zero-thickness to infinite thickness. If, however, we are interested only in a smaller range, the chart will be ruled accordingly.

The ruling of chart 205 may be derived in any suitable manner, but we will outline one procedure which is satisfactory and will make certain points clear. However, this is not to be considered as at all limitative. Having determined that the full scale of the chart shall be established by the given spacing between pre-drawn lines 208 and 209 and having ruled those lines accordingly, the exciter coil 88 is de-energized, thus simulating the condition which would prevail if the work were of infinite thickness, since, in either case, there is no voltage induced in pick-up coil 144. Since there is then no modifying effect on the full current supplied to wire 200 by source 199, marker 204 would go to some extreme position on chart 205. Potentiometer 201 is then adjusted to give marker 204 a full scale position, that is, the current from source 199 is adjusted at the output side of the potentiometer to an amount which will place marker 204 on "infinity" line 208.

The coil 88 is now energized and the opposed poles of the exciter and pick-up units are contacted, thus simulating work of zero thickness, at which time the reluctance of the secondary flux circuit is at a minimum, the induced voltage of the secondary flux is at a maximum, and the current output of the converter tube circuit 198 is at a minimum. Since we want the marker, at this time, to indicate zero-thickness, potentiometer 192 is adjusted until its output voltage is of such value that source 199, under the control of converter tube circuit 198, brings the marker to the zero line 209.

Test pieces of known thicknesses and of material like that to be measured, are then successively introduced between the exciter and pick-up units, and the chart is ruled between lines 208 and 209 at points where marker 204 comes to rest as each individual test piece is introduced. The ruling in Fig. 26 represents the response when the work is in the nature of oil well drill pipe and converter circuit 198 includes a 6-SK-7, variable mu tube.

Except where the characteristic response for different materials happens to be exactly the same throughout the thickness range, theoretically it would be necessary to prepare charts having individually different scale-characteristics (except for the zero and infinity lines) for each type of material being measured. An instance of using exactly the same scale characteristics for different materials, and yet securing fully accurate results in each case, is that represented when dielectric materials are being measured. Since, in that case, the initial ruling of the chart will be based on the response of marker 204 as brought about solely by variations in the extent of gaps 169, 170 and 171 and as though no work were present, it makes no difference what may be the differential characteristics of other dielectric material—the response of the marker will always be affected only by changes in the variations in those gap extents and therefore will be to the same scale.

Even though the work be magnetic, or conductive but non-magnetic, and though the response per unit change of thickness does not conform exactly to the rulings of a given chart, it is not always necessary to prepare a separate chart for each individual type of such material. For instance, the tube of circuit 198 used in preparing the chart, may have substituted for it a tube having such individual characteristics that, with a material having charatceristics differing from the charted characteristics, the response of marker 204 will conform exactly to the original chart-ruling. Or the same effect may be obtained by properly changing the circuit elements of the particular converter tube circuit 198 which was used in establishing the original chart-rulings.

Furthermore, assuming a situation where several materials of a given general character differ in certain specific characteristics, and assuming a chart has been ruled in accordance with the response from one of these materials, it is often possible to use that one chart for recording the thickness of the other of such materials within acceptable tolerances. For instance, assume that a known-thickness test piece of a material differing somewhat from the charted test piece, be applied between the exciter and pick-up units and that the marker 204 is only slightly displaced from the correctly corresponding thickness-indicating line on the chart, potentiometer 192 may be adjusted to bring the marker exactly on that line. Then test pieces of the second material and of other known thicknesses are interposed between the exciter and pick-up units and, if the marker 204 does not fall too far away from corresponding thickness-indicating rulings on the chart, the chart may be used to record the thickness of actual work pieces made of the second material, and the record will be sufficiently accurate for most purposes.

As an example of such adjustment of potentiometer 192, consider the measurement of a string of drill pipe made up of sections having such individually different characteristics that the recorder response per unit thickness variation will vary slightly as between sections, but it has been predetermined that a single chart ruling will suffice for all sections. Then, prior to the introduction of each section to the exciter and pick-up units, the wall thickness of each section is calipered at a marked point near one end of the section. Then the section is introduced to the exciter and pick-up units, with the poles 86, 138 in line with the marked point. Potentiometer 192 is then adjusted until marker 204 is at the position on the chart scale which corresponds with the calipered thickness, and the thickness record thereafter made on the chart as the work is traversed by the exciter and pick-up units, will be sufficiently accurate for most purposes.

The curve 215 represents a portion of a hypothetical trace such as may develop from the measurement of drill pipe while the pipe is simultaneously rotated and moved axially, as previously described; the pipe, on the one hand, and the exciter and pick-up units on the other hand, moving relatively spirally. For purposes of discussion it may be assumed that the timed relation of the ultimate drives of motors 43 and 206 is such that for each revolution of the pipe, the pipe moves axially 2" and the chart 205 moves a distance 216. It may also be assumed that the "nominal" thickness of the pipe is .35". The portion 217 of curve 215 indicates that, for the first 2" of the linear extent of the pipe, the wall thickness is substantially "normal," the inner and outer peripheral faces throughout this linear extent being substantially concentric. The portion 218 of the curve indicates that in the second 2" increment of pipe length, the wall thickness at one side of the pipe is reduced to .2", or far below the "nominal" value, while, at the diametrically opposite side, the wall thickness is approximately nominal, this showing indicating that the pipe is worn only throughout half its circumference.

Portion 219 of the curve indicates that, in the third increment of pipe length, the wall thickness at one side of the pipe is reduced to about .225" and that the pipe is worn about its entire circumference, the wear being substantially evenly progressive from one point on the pipe to a diametrically opposite point on the pipe.

Portion 220 of the curve indicates that in the fourth increment of pipe length, the pipe is eccentric, the diminished wall thickness at one side being offset by a correspondingly increased wall thickness at the diametrically opposite side.

Of course, many additional conclusions may be drawn from the characteristics of the curve, and the curves may have many characteristics other than those illustrated, but the above discussion will serve to illustrate typical chart interpretations.

The curve, as described above, represents a spiral traversing of the pipe and, as has been previously described, the lead may be varied to vary the extent of detailed readings over a given length of pipe. The previously described reverse-traversing of the pipe after actuation of the lost-motion mechanism of Figs. 20 to 22, has the effect of reducing the lead of the spiral and correspondingly increasing the area surveyed in detail.

Of course, when the pipe is traversed axially, only, as by disconnecting the pipe-rotating means, the curve on chart 205 will represent pipe thickness along a straight line extending axially of the pipe; while, if the pipe is rotated without axial translation, the curve on the chart will indicate the thickness of the pipe as measured circumferentially about the pipe throughout a plane which is normal to the pipe axis.

As so far described, the exciter and pick-up units are physically separated by the work. In some cases the work is of such a nature as to preclude such separation, only one side of the work being accessible for the application of measuring elements. Fig. 27 illustrates schematically a variational embodiment of my invention wherein the exciter and pick-up coils are arranged at the same side of magnetic work P, the system being such that, as in the previously described system, the reluctance of the secondary flux path is greater than the combined reluctances of the several primary flux paths, and the thickness indication is taken from the secondary flux circuit.

Here, the single core 230 is E-shaped and has three poles 231, 232 and 233, the exciter coil 88a and pick-up coil 144a being on opposite terminal poles 231, 233, respectively.

It is assumed that the core rides over work P and is supported by means such as rollers 150 of Figs. 12 and 13 so that the air gaps 234, 235 and 236 are each of relatively constant value.

While the previous general comments regarding the showing of flux paths 181, 182, 183 and 184 apply generally to flux paths 237, 238, 239 and 240, respectively; line 237, representing the path of the secondary flux, and line 238, representing a path of primary flux, now pass longitudinally through the work. Line 239 represents a path of primary flux which passes longitudinally through the work; and line 240 represents a path of primary flux which avoids work P entirely. It will be seen that gap 234 has portions which are common to secondary flux path 237 and primary flux paths 238 and 239, but it has no portion which is common to secondary path 237 and primary path 240.

Obviously, the reluctance of secondary path 237 is greater than that of primary path 239, for instance, and therefore is greater than the sum of the primary paths taken in parallel. It follows that the secondary flux will always be less than the primary flux; and, as has been said, it is the secondary flux which is measured to indicate work-thickness.

With the core applied to work of given thickness, the secondary flux will be of given value. If now the work be of increased thickness, the reluctance of the secondary flux path 237 of primary flux paths 238 and 239 will be diminished, but the reluctance of primary flux path 240 will be unaffected. Therefore a greater proportion of the "total" flux will flow through secondary flux path 237 and the voltage induced in coil 144a will be of correspondingly increased value.

Pick-up coil 144a may be connected into the circuit shown in Fig. 25, though now an increased response on voltmeter 190 indicates an increase in work thickness and, accordingly, the tube circuit 198 is altered to remove its inverting characteristics.

It will be seen that, since the secondary flux path 237 now has a portion extending longitudinally through the work, the thickness indication established by an induced voltage of given value in the secondary circuit represents the average thickness of the work throughout that longitudinal extent. Accordingly, the accuracy of the measure of "local" thickness is less than that which is obtained when the two-unit system of Fig. 16a is used, for there the measure of the local thickness at opposed poles 86—138 is only slightly modified by the effect of the work at two other local points, namely, at opposed poles 85—137 and 87—139. However, the degree of accuracy obtained by use of the system of Fig. 27 is within the limit-requirements of certain types of measurement.

While I have shown and described preferred embodiments of my invention, it will be understood that various changes in the system and in the design and arrangement of parts may be made without departing from the spirit and scope of the appended claims.

I claim:

1. In a device of the character described, a two-part, magnetic-flux-operated work-thickness measuring device, one of the parts being an exciter and the other part being a pick-up, the two parts being adapted to be arranged at opposite sides of work to be measured, means holding said parts in mutual alinement, means for relatively moving the work and the measuring device, said parts being independently movable toward and away from each other while in such alinement in a manner whereby each part may, during such movement, individually follow the contour of the work surface to which it is directly opposed.

2. In a device of the character described, a two-part, magnetic-flux-operated work-thickness measuring device, one of the parts being an exciter and the other part being a pick-up, the two parts being adapted to be arranged at opposite sides of work to be measured, means holding said parts in mutual alinement, means for relatively moving the work and the measuring device, said parts being independently movable toward and away from each other while in such alinement in a manner whereby each part may, during such movement, individually follow the contour of the work surface to which it is directly opposed, and means for holding said parts in engagement with their respective opposed work surfaces during such movement.

3. In a device of the character described, a work-thickness measuring member adapted to be applied to a peripheral face of tubular work, means adapted to move the work and member relatively through a spiral path in one direction longitudinally of the work, means adapted to move the work and member relatively through a spiral path in the opposite direction longitudinally of the work, means adapted alternately to put the two previously mentioned means into operation, and a lost-motion escapement acting automatically upon a reversal of said direction of movement, as brought about by said last mentioned means, to locate the coils of one spiral path intermediate the coils of the other spiral path.

4. In a device of the character described, a pipe thickness measuring unit adapted to be entered in the bore of a pipe and embodying a body member, yielding means acting between the pipe and said body member and yieldingly urging said body member radially towards the inner peripheral face of the pipe, and rollers mounted on the body member and rotatable about axes substantially parallel to the pipe axis, said rollers projecting radially from one face of the body member and adapted to engage said peripheral face under the force of said urging means and thereby radially spacing the body member from said peripheral face, said rollers being resiliently deformable in the direction of the pipe axis.

5. In a device of the character described, a pipe thickness measuring unit adapted to be entered in the bore of a pipe and embodying a body member, and yielding means acting between the pipe and said body member and yieldingly urging said body member radially towards the inner peripheral face of the pipe, said yielding means including a shoe, parallel linkage between the shoe and body member, and a spring acting to swing said linkage in a manner to relatively radially displace the body member and shoe.

6. In a device of the character described, a pipe thickness measuring unit adapted to be applied to the outer peripheral face of a pipe and embodying a body member, a core of transformer iron carried by the body member, an energizable coil operatively associated with the core, rollers carried by and extending beyond said body member and adapted to engage the pipe, said rollers being adjustable to vary the amount of their extension, and means holding the body member against movement in the direction of the pipe-axis, said last mentioned means permitting movement of the body member transverse to the axis of the pipe whereby the rollers may follow the contour of the pipe surface as the latter is moved beneath it.

7. In a device of the character described, a pipe thickness measuring unit adapted to be applied to the outer peripheral face of a pipe and embodying a body member, a core of transformer iron carried by the body member, an energizable coil operatively associated with the core, rollers carried by and extending beyond said body member and adapted to engage the pipe, the rollers being adjustable to vary their planes of rotation, and means holding the body member against movement in the direction of the pipe-axis, said last mentioned means permitting movement of the body member transverse to the axis of the pipe whereby the rollers may follow the contour of the pipe surface as the latter is moved beneath it.

8. A device as set forth in claim 5 in which said shoe embodies a head member, and a work-engaging roller on the head member and rotatable about an axis parallel to the axis of the body member.

9. A device as set forth in claim 5 in which said shoe embodies a head member, and a work-engagement roller on the head member and rotatable about an axis parallel to the axis of the body member, said roller being resiliently deformable in the direction of the body member axis.

10. In a device of the character described, a pipe thickness measuring unit adapted to be entered in the bore of a pipe and embodying a body member, rollers mounted on the body member and rotatable about axes substantially parallel to the body member axis, said rollers projecting radially from one face of the body member, and yielding means acting between the pipe and said body member and yieldingly urging said body member radially towards the inner peripheral face of the pipe, said yielding means including a shoe, parallel linkage between the shoe and body member, and a spring acting to swing said linkage in a manner to relatively radially displace the body member and shoe; said shoe embodying a head member, and a work-engaging roller on the head member and rotatable about an axis parallel to the axis of the body member.

11. In a device of the character described, a pipe thickness measuring unit adapted to be entered in the bore of a pipe and embodying a body member, and yielding means acting between the pipe and said body member and yieldingly urging said body member radially towards the inner peripheral face of the pipe, said yielding means including a pair of shoes, one at each end of the body member, parallel linkage between each shoe and the body member, and a pair of springs associated, one each, with the shoes and acting to swing the linkage in a manner to relatively radially displace the body member and shoes.

12. In a device of the character described, a pipe thickness measuring unit adapted to be entered in the bore of a pipe and embodying a body member, and yielding means acting between the pipe and said body member and yieldingly urging said body member radially towards the inner peripheral face of the pipe, said yielding means including a pair of shoes, one at each end of the body member, parallel linkage between each shoe and the body member, and a pair of springs associated, one each, with the shoes and acting to swing the linkage in a manner to relatively radially displace the body member and shoes; a roller mounted on the body member and rotatable about an axis substantially parallel to the body member axis and projecting radially from one face of the body member, and a pair of work-engaging rollers arranged, one each, on said shoes, said last mentioned rollers being rotatable about axes parallel to the axis of the body member.

13. In a device adapted to receive and measure work of variable thickness, the work and device being relatively movable, said device embodying a support, an exciter adapted to produce magnetic flux varying between constant values at constant frequencies, means adapted to establish at least a pair of circuits for exciter produced flux, means adapted to accommodate the work in a position where it is interposed in at least one of the circuits, means maintaining the magnetic reluctance of said one circuit at a higher value than that of another circuit, work-engaging means movably connected to the support and, during such relative movement of the device and work, moving with respect to the support in a manner maintaining, as a part of said one circuit, an air gap of predetermined effective length, regardless of variations in the thickness of the work, an indicator actuating means in said one circuit and responsive in accordance with the instant value of the flux therein, said air gap extending between said work and said actuating means.

14. A device according to claim 13; wherein said work-engaging means is adjustable whereby the effective length of said air gap is regulatable.

15. A device according to claim 13; wherein the exciter is arranged at one side of the work and said air gap is immediately adjacent the side of the work which is remote from the exciter.

GEORGE E. LEWIS.

REFERENCES CITED

The following references are of record in the file of this patent:

UNITED STATES PATENTS

| Number | Name | Date |
| --- | --- | --- |
| 1,925,904 | Mayne | Sept. 5, 1933 |
| 2,041,058 | Fossati | May 19, 1936 |
| 2,051,780 | Brown | Aug. 18, 1936 |
| 2,111,210 | Ebel | Mar. 15, 1938 |
| 2,116,119 | Loewenstein | May 3, 1938 |
| 2,124,579 | Knerr et al. | July 26, 1938 |
| 2,133,725 | Sperry et al. | Oct. 18, 1938 |
| 2,155,267 | Hathaway | Apr. 18, 1939 |
| 2,195,504 | Stone | Apr. 2, 1940 |
| 2,226,275 | Abbott et al. | Dec. 24, 1940 |
| 2,258,104 | Seymour | Oct. 7, 1941 |
| 2,258,748 | Drake | Oct. 14, 1941 |
| 2,269,152 | Hathaway | Jan. 6, 1942 |
| 2,315,943 | De Lanty | Apr. 6, 1943 |
| 2,331,418 | Nolde | Oct. 12, 1943 |
| 2,417,678 | Cox | Mar. 18, 1947 |

FOREIGN PATENTS

| Number | Country | Date |
| --- | --- | --- |
| 460,991 | Great Britain | Mar. 11, 1937 |